United States Patent [19]

Schluckebier

[11] 4,177,714
[45] Dec. 11, 1979

[54] TORSION BAR FOR POWER STEERING GEAR

[75] Inventor: Floyd A. Schluckebier, Vassar, Mich.

[73] Assignee: General Motors Corporation, Detroit, Mich.

[21] Appl. No.: 844,624

[22] Filed: Oct. 25, 1977

[51] Int. Cl.² .............................................. F15B 9/10
[52] U.S. Cl. ................................. 91/375 A; 403/278; 403/282; 403/371
[58] Field of Search ............ 91/375 A; 403/371, 282, 403/278

[56] References Cited

U.S. PATENT DOCUMENTS

| | | | |
|---|---|---|---|
| 1,535,117 | 4/1925 | Fulton et al. | 403/371 |
| 1,739,740 | 12/1929 | Stoeltzlen | 403/371 |
| 2,988,059 | 6/1961 | Wysong, Jr. | 91/375 A |
| 3,022,772 | 2/1962 | Zeigler et al. | 91/375 A |
| 3,296,940 | 1/1967 | Eddy et al. | 91/375 A |
| 3,458,998 | 8/1969 | Bishop | 91/447 |
| 3,906,837 | 9/1975 | Sheppard | 91/378 |
| 4,009,641 | 3/1977 | Rohde et al. | 91/375 A |

*Primary Examiner*—Paul E. Maslousky
*Attorney, Agent, or Firm*—Charles R. White

[57] ABSTRACT

This invention relates to power steering gears for vehicles and more particularly to a torsion bar for a power steering gear and new and improved connections between the torsion bar and components of the gear for improved gear assembly and operation.

2 Claims, 4 Drawing Figures

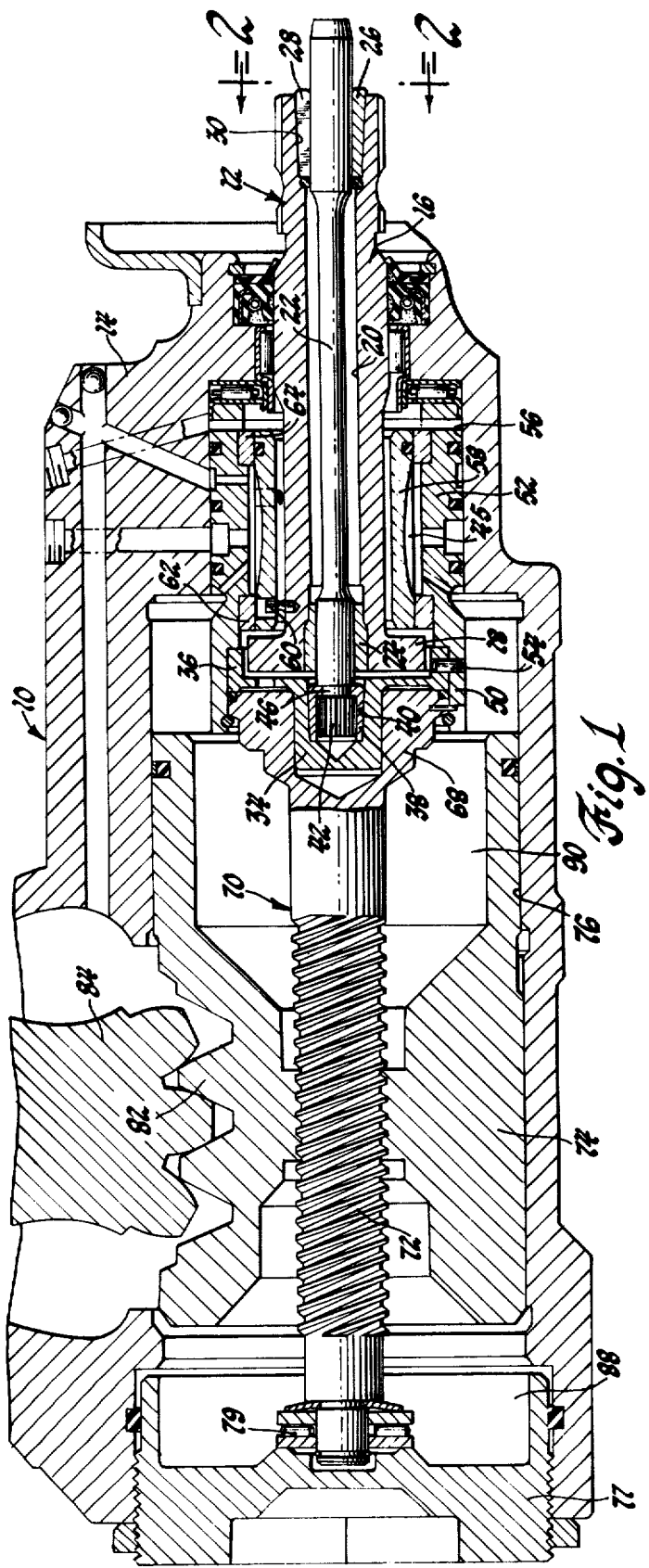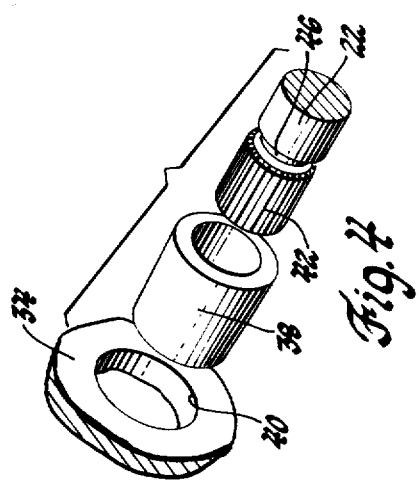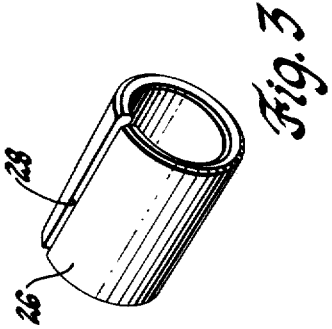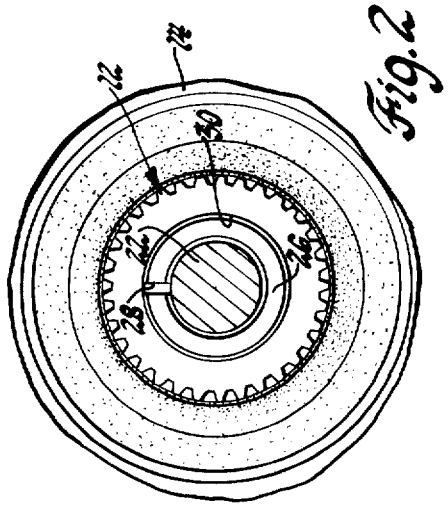

TORSION BAR FOR POWER STEERING GEAR

Prior to the present invention, many vehicular power steering gear designs incorporated a torsion bar disposed within a rotary hydraulic valve of the gear to provide for valve centering for hydraulic balance of the piston nut and to further provide for steering "feel" in the hand wheel so that the vehicle operator experiences desired resistance to applied steering effort. Generally the prior torsion bars were fastened at their outboard ends by radial pins extending through bores drilled through the torsion bars and the stub shafts. The inboard ends were similarly fastened by radial pins extending through bores drilled through the inner end of the torsion bars and valve caps. With this prior construction, each torsion bar was securely fastened in the gear ready for maximized twisting load. In the initial assembly of such a torsion bar, it is necessary to center or hydraulically balance the valve element before the torsion bar and the stub shaft and valve cap are drilled for the retainer pins. It has been found that such drilling operations produce a radial force on the torsion bar that tends to make the valve assembly hydraulically unbalanced. Also, in cross drilling operation for the connector pin, the drill sometimes wanders slightly off center, thus, imparting radial forces on to the torsion bar which causes the connected valve elements to shift out of hydraulic balance. This may result in rejected parts which have to be remanufactured or scrapped. Furthermore, the manufacture of steering gear units with radially pinned torsion bars is tedious and expensive.

This invention takes advantage of the low torque loads which most power steering gear torsion bars experience and effectively utilizes new and improved low torque load fastener sleeves in place of steel pins and radial drilled holes. With this invention, the prior art problems of valve centering and torsion bar fastening are essentially eliminated. The fastener sleeves of this invention tightly grip the opposite ends of the torsion bar so that they are secured to the stub shaft and valve cap with the valve elements properly centered and hydraulically balanced.

In the preferred embodiment of the invention, the torsion bar is gripped by a special annular locking sleeve comprising a split tapered locking sleeve which when inserted in a tapered bore in the stub shaft or other gear element acts as a collet to grip the torsion bar to hold and secure one or both ends thereof. In addition to the split sleeve, a soft metal insert sleeve surrounding an end portion of the torsion bar can be effectively utilized to connect the end of a torsion bar to a gear element. The end of the bar and surrounding sleeve are axially forced into a tapered locking hole in the stub shaft or valve cap. The soft metal cold flows into serrations on the torsion bar with the applied pressure to securely attach the torsion bar to its mounting element.

It is a feature, object and advantage of this invention to provide a new and improved connection for torsion bars in power steering gears which features a sleeve and tapered bore means to operatively secure the ends of the torsion bar in the gear without drilling and radial pinning.

It is another feature, object and advantage of this invention to secure a torsion bar of a power steering gear to its drive member by a tapered metal sleeve which is in the form of a split sleeve to act as a collet to grip the torsion bar. In another form the sleeve can be generally cylindrical and of soft metal which, when forced into a tapered bore, cold flows onto serrations formed on one end of the torsion bar to form a rigid connection.

These and other features, objects and advantages of this invention will be more apparent from the following detailed description and drawings in which:

FIG. 1 is a side sectional view of a power steering gear with certain parts in elevation;

FIG. 2 is a sectional view taken generally along lines 2—2 of FIG. 1;

FIG. 3 is a perspective view of a tapered torsion bar locking sleeve employed in the steering gear of FIG. 1 and forming a first embodiment of this invention; and FIG. 4 is a perspective view of a second locking sleeve employed in the steering gear of FIG. 1 and forming a second embodiment of this invention.

Turning now in greater detail to the drawings, there is shown in FIG. 1 a power steering gear 10 having an elongated stub shaft 12 projecting into the steering gear housing 14. The stub shaft has a generally cylindrical body 16 which extends from outside of the housing 14 to an interior position terminating in an enlarged cylindrical head portion 18. The stub shaft 12 has an axial passage 20 that receives an elongated torsion bar 22 extending therethrough which is supported for twisting movement therein by inboard bearing 24. The outer end of torsion bar 22 is rigidly secured in the stub shaft by a special locking sleeve 26 formed by a resilient tapered cylinder of a suitable resilient metal which has a longitudinally extending slit 28 in the wall thereof. Locking sleeve 26 is adapted to substantially surround and tightly grip one end of the torsion bar 22 when inserted in a tapered opening 30 formed within the outer end of the stub shaft. When inserted into the tapered opening 30, the split sleeve will be progressively constricted by the tapered wall of opening 30.

With the outer surface of the locking sleeve in frictional engagement with opening 30, and with the inner surface of the locking sleeve in engagement with the outer end of the torsion bar, the outboard end of the torsion bar is secured to the outer end of the stub shaft for turning movement therewith.

The inner end of the torsion bar is fixed to a hub 34 of a disc-like cap 36 by a cylindrical metallic fastener sleeve 38 somewhat similar to the locking sleeve 26. As shown, the hub 34 has a tapered bore 40 formed therein which receives the serrated inboard end 42 of the torsion bar 22. The metallic sleeve 38 is cylindrical in form and is of a soft metal such as aluminum, brass or copper and is disposed around the serrated end of the torsion bar. The sleeve may be slightly tapered, if desired. However, the taper should be less than that of the bore 40 in view of the fact that the sleeve is squeezed radially inwardly when inserted into the bore 40. This action cold flows the soft metal into the serration of the inboard end 42 of the torsion bar so that the inner end of the torsion bar is secured to the cap 36. The outer end of the sleeve 38 may be collared inwardly by special tooling into the groove 46 formed in the torsion bar so that the sleeve may be connected to the torsion bar as an assembly to facilitate insertion of the sleeve into the tapered bore 40.

The other components of this power steering gear are disclosed in prior U.S. Pat. No. 4,009,641 for "Compact Power Steering Gear", issued Mar. 1, 1977 to Rohde et al and the disclosure thereof is hereby incorporated by reference. Briefly, however, it will be seen that the cap 36 has an outer rim that closely fits within the inner end 50 of a cylindrical valve body 52 and is secured thereto by a pin 54. Valve body 52 is mounted for turning movement in bore 56 formed in the housing. Disposed radially inwardly of the valve body is a valve spool 58 which is secured to stub shaft 16 by pin 60. Annular rings 62 and 64, located between the valve body 52 and valve spool 58, close off the end of internal, arcuately-spaced and longitudinally-extending slots 45 formed in the valve body. The valve body and valve spool form a valve assembly to control the power steering gear as described in U.S. Pat. No. 3,022,772 issued Feb. 27, 1962 to Ziegler et al for "Rotary Power Steering Valve with Torsion Bar Centering."

Nested within the inner end 50 of valve body 52 and adjacent to cap 36 is an enlarged annular head portion 68 of an elongated screw 70. The screw 70 has a centralized shank 72 that extends axially into the power steering unit 10 and is threaded through piston nut 74 mounted for sliding movement in a piston bore 76 formed in housing 14 and closed at its outer end by adjuster plug 77. The terminal end of screw 70 is rotatably supported by thrust bearing 79 centrally supported on the adjuster plug 77 while the head portion of the screw is operatively connected to stub shaft 12 by a suitable lost motion connection such as disclosed in U.S. Pat. Nos. 4,009,641 and 3,022,772 referenced above. The piston nut has a rack with teeth 82 which mesh with the teeth of a sector gear 84 rotatably mounted in the housing 14 and operatively connected to the pitman shaft of steering linkage, not shown. The piston nut divides the bore into separate pressure chambers 88 and 90 and the valve assembly actuated by the stub shaft controls the supply and exhaust of fluid with respect to these chambers to provide for the hydraulic power assist steering of the vehicle.

With the construction described above, it will be appreciated that the valve spool is connected to the outboard end of the torsion bar by the pin 60, stub shaft 16 and the tapered locking sleeve 26. The valve body is connected to the inboard end of the torsion bar by the tapered soft metal sleeve 38, the cap 36 and pin 54. With a load applied to the output represented by sector gear 84, it will be appreciated that there is relative rotation between the two valve elements on rotary input of the stub shaft to effect the power steering of the vehicle as controlled by the valve assembly. On cessation of the hand wheel input, the torsion bar will unwind to center the valve element to a hydraulically balanced position so that there is no power steering applied to the sector gear. Accordingly, it will be appreciated that the hydraulic balancing of the valve spool and the valve body is of importance in power steering gear construction. With this invention, the valve spool and valve body can be easily and effectively placed in their balanced position using the tapered locking sleeve 26 and the tapered soft metal insert sleeve 38. This eliminates the necessity of drilling the radial openings through the torsion bar, the stub shaft and cap member as in the prior art.

While two embodiments of this invention have been disclosed and illustrated as securing the opposite ends of the torsion bar to relatively rotatable component, it will be appreciated that either embodiment can be used to secure opposite ends or that the positions of the tapered locking sleeves and the soft metal insert sleeve can be reversed if desired.

While preferred embodiments of this invention have been shown and described to illustrate the invention, other embodiments will become more apparent to those skilled in the art. Accordingly, the scope of this invention is set forth in the following claims.

I claim:

1. A power steering gear comprising a housing, a stub shaft forming first rotatable means mounted for turning movement in said housing, an output operatively mounted for turning movement in said housing and extending outwardly therefrom, hydraulically powered actuator means operatively mounted in said housing for moving said output, said actuator means having gear means drivingly connected to said output so that said output moves in response to movement of said actuator means, valve means in said housing operatively connected to a source of pressurized hydraulic fluid selectively movable to effect the hydraulic powered movement of said actuator means and said output, said valve means comprising a valve body member and a spool member, threaded means forming second rotatable means operatively connecting said actuator means to said valve body member and said stub shaft for mechanically moving said actuator means in said housing, torsion bar means having a cylindrical end portion extending into said stub shaft providing a centering spring interconnection between said valve body and spool members, and first fastener means formed by a resilient and tapered thin-walled sleeve having a longitudinal slot extending through the wall thereof, said sleeve being operatively disposed around said cylindrical end of said torsion bar means for securing said cylindrical end to one of said rotatable means, second fastener means including a deformable locking sleeve operatively securing the other end of said torsion bar to the other of said rotatable means to permit winding of said torsion bar and the relative turning of said valve members in response to rotation of said stub shaft for the hydraulic powered movement of said actuator means and said output.

2. A power steering gear comprising a housing, a stub shaft mounted for turning movement in said housing, an output operatively mounted for turning movement in said housing and extending outwardly therefrom, hydraulically powered actuator means mounted in said housing for moving said output, said actuator means having gear means drivingly connected to said output so that said output moves in response to movement of said actuator means, valve means in said housing operatively connected to a source of pressurized hydraulic fluid selectively movable to effect the hydraulic powered movement of said actuator means and said output, said valve means comprising valve body and spool members, rotatable actuator means operatively connecting said actuator means to said valve body member and said stub shaft for mechanically moving said actuator means in said housing, torsion bar means extending into said stub shaft providing a centering spring interconnection between said valve body and spool members, resilient metal spring sleeve means for operatively securing one end of said torsion bar in said stub shaft and soft metal locking sleeve means disposed completely around the other end of said torsion bar and forced radially inwardly by a tapered bore in means connected to said rotatable actuator means into engagement with said torsion bar to thereby connect said other end of said torsion bar with one of said valve members so that said torsion bar is wound in response to the turning movement of said stub shaft.

* * * * *